United States Patent
Hauser et al.

(10) Patent No.: US 8,466,590 B2
(45) Date of Patent: Jun. 18, 2013

(54) PLUG-IN SENSOR BOARD FOR BRUSHLESS DIRECT CURRENT MOTOR

(75) Inventors: Erwin Hauser, Emmendingen (DE); Erich Becker, Bad Krozingen (DE)

(73) Assignee: KNF Neuberger GmbH, Freiburg (DE)

(*) Notice: Subject to any disclaimer, the term of this patent is extended or adjusted under 35 U.S.C. 154(b) by 715 days.

(21) Appl. No.: 12/611,175

(22) Filed: Nov. 3, 2009

(65) Prior Publication Data
US 2010/0109458 A1 May 6, 2010

(30) Foreign Application Priority Data
Nov. 4, 2008 (DE) .............................. 102008055731

(51) Int. Cl.
*H02K 11/00* (2006.01)
(52) U.S. Cl.
USPC .......................................... 310/68 B; 310/71
(58) Field of Classification Search
USPC ................................................ 310/71, 68 B
See application file for complete search history.

(56) References Cited

U.S. PATENT DOCUMENTS

| | | | |
|---|---|---|---|
| 7,215,052 B2 * | 5/2007 | Blase et al. ..................... | 310/87 |
| 2006/0175913 A1 * | 8/2006 | Hempe et al. .................. | 310/50 |

FOREIGN PATENT DOCUMENTS

| | | |
|---|---|---|
| DE | 10045596 | 4/2002 |
| DE | 202006012075 | 1/2008 |
| EP | 1324465 | 7/2003 |
| EP | 1758228 | 2/2007 |

* cited by examiner

*Primary Examiner* — Tran Nguyen
*Assistant Examiner* — David Scheuermann
(74) *Attorney, Agent, or Firm* — Volpe and Koenig, P.C.

(57) ABSTRACT

A brushless direct current motor including a rotor having permanent magnets, which rotates in a commutation created alternating magnetic field of a stator (1) is provided, which magnetic field is created by a coil system of wire coils (3) applied on an insulating body (4) in the circumferential direction and spaced apart from each other. Control electronics are provided for controlling the electric wire coils, spaced apart from each other, of the control system provided in the stator (1), with non-contact rotary position sensors (5) being allocated to the phases of the coil system (2). In the direct current motor according to the invention the rotary position sensors (5) are arranged on a sensor carrier (13). The sensor carrier (13) can be fastened at least at one face of the stator (1), and positioning aids cooperating with each other are arranged between the sensor carrier (13) and the adjacent stator face, which determine a relative position of the stator (1) in reference to the sensor carrier (13) and the rotary position sensors (5) arranged thereupon. If applicable, the direct current motor can be produced in an automated production method with little expense.

3 Claims, 6 Drawing Sheets

PLUG-IN SENSOR BOARD FOR BRUSHLESS DIRECT CURRENT MOTOR

CROSS-REFERENCE TO RELATED APPLICATIONS

This application claims the benefit of German patent application no. 10 2008 055 731.5, filed Nov. 4, 2008, which is incorporated herein by reference as if fully set forth.

BACKGROUND

The invention relates to a brushless direct current motor comprising a rotor equipped with permanent magnets rotating in the magnetic field of a stator which alternates by way of commutation, which magnetic field can be created by a coil system of wire coils, provided on an insulating body in the circumferential direction and at a distance from each other, with a control system being provided to control the electric wire coils of the coil system, spaced apart from each other and provided inside the stator, allocated to the phases of the noncontact rotary position sensors allocated to the coil system.

It is already known to use brushless direct current motors as pump drives. Such brushless direct current motors are characterized in high effectiveness; while electric motors with brushes only have a life of 3000 to 4000 operating hours, the life of brushless electric motors is considerably longer. Due to the fact that the rotary impulses in brushless electric motors are introduced electronically such brushless direct current motors are almost completely free from wear and tear. Additionally, such direct current motors may be adjusted to the amperage of the national power grid using an integrated power supply.

The brushless direct current motors of prior art usually operate with Hall sensors, which detect the rotor position such that the commutation of the electric motor can occur at the correct time. The torque of brushless direct current motors largely depends on the control of the Hall sensors used to control the stator coils are optimally positioned in reference to the rotor and the controlled coils. In the brushless direct current motors of prior art the Hall sensors are usually adhered to the stator at the predetermined positions, with the electric contacts of the hall sensors have to be soldered to the control electronic. The alignment, the adhesion, and the soldering of the hall sensors require considerable expenses, though.

SUMMARY

Therefore the object is to provide a brushless direct current motor of the type mentioned at the outset that can be produced cost-effectively with comparatively little expense.

The object is attained according to the invention in the direct current motor of the type mentioned at the outset particularly in that the sensors for the rotary position are arranged on a sensor carrier, that the sensor carrier can be fastened at least at one face of the stator, and that positioning aids are arranged between the at least one sensor carrier and the adjacent stator face, cooperating with each other, which determine the relative position of the stator in reference to the at least one sensor carrier and the rotary position sensors arranged thereupon.

The direct current motor according to the invention comprises a sensor carrier, on which the rotary position sensors of the control electronics are arranged. One such sensor carrier can be fastened at least at one face of the stator. Here, positioning aids cooperating with each other are provided between the at least one sensor carrier and the adjacent stator face, which positioning aids determine the relative position of the stator in reference to the at least one stator carrier and the rotary position sensors arranged thereupon. Due to the fact that therefore a manual alignment of the rotary positioning sensors in reference to the stator, the adhesion of said rotary position sensor inside the stator, and the soldering of the rotary position sensors to the other electric parts of the direct current motor are avoided, the direct current motor according to the invention can be produced with little expense, and this direct current motor, due to the always precise alignment of the rotary position sensors in reference to the wire coils provided at the stator, is characterized by a correspondingly high torque.

In order to facilitate the connection of the rotary position sensors to the other electric parts of the direct current motor according to the invention it is particularly advantageous for at least one sensor carrier to be embodied as a sensor board carrying rotary position sensors.

The rotary position sensors allocated to the control electronic may be arranged on different sensor carriers and there electrically connected to each other, with the sensor carriers may each be fastened at one of the two faces of the stator. In order to even further reduce the expense connected to the production of the direct current motor according to the invention it is particularly advantageous when the rotary position sensors allocated to the phases of the coil system are arranged on a common sensor plate.

The low production expense additionally benefits from the control electronics being connected to the supply lines of the wire coils, spaced apart from each other, using electric contacts embodied as positioning aids.

Here, the electric contacts embodied as positioning aids may be provided on the at least one sensor carrier and/or the stator.

However, a preferred embodiment according to the invention provides for the contacts serving as positioning aids and provided on the at least one sensor carrier being embodied as cutting terminals. Without any additional expensive soldering process and perhaps even without any insulation of the electric wires, the cutting terminals provided at the sensor carrier may be connected to the other electric components of the direct current motor according to the invention by a simple plug connection.

Here, a precisely positioned alignment of the stator, on the one side, and the sensor carrier with the rotary position sensor located thereupon, on the other side, is facilitated when the supply lines of the wire coils, spaced apart from each other, are held in the wire guides of the stator, defined in their position, by wire sections contacting the cutting terminals.

A preferred further development according to the invention provides that each wire guide exhibits guide openings intersecting each other, with one guide opening thereof serving to accept a wire section contacting the cutting terminal and another guide opening, that is open at the face, serving to introduce one cutting terminal each.

The supply lines allocated to the wire coils, spaced apart from each other, can be guided in a particularly easy fashion in the area of the stator housing and the sensor carrier can be fastened at the stator face with little expense when the guide openings of each wire guide, provided to receive the wire sections and/or to introduce the cutting terminals, are embodied in a slot-shaped fashion.

A preferred embodiment according to the invention provides, at least at one face allocated to the sensor carrier, for the stator to comprise protrusions embodied in a crown-shaped fashion, with at least some protrusions being embodied as wire guides. By a meandering arrangement of the supply lines allocated to the wire coils, spaced apart from each other, around the individual protrusions the electric wires can be guided along the perimeter of the stator. When at least individual protrusions as well as wire guides are provided, the sensor carrier may be fastened at the stator in a simple fashion and simultaneously precisely positioned, with simultaneously the electric connection being created between the control electronic, on the one side, and the other electric parts of the direct current motor according to the invention, on the other side.

An automated production process is promoted when the stator comprises a sheath-like stator housing, with one insulation cap being provided at each face, with at least one insulating cap being embodied to connect to a sensor carrier and with the insulating caps provided at both sides of the stator carrying between each other the wire, spaced apart from each other, of the multi-phase coil system allocated to the stator.

BRIEF DESCRIPTION OF THE DRAWINGS

Additional features of the invention are discernible from the claims in connection with the drawings and the description. In the following the invention is described in greater detail using a preferred exemplary embodiment:

Shown in schematic illustration are.

DETAILED DESCRIPTION OF THE PREFERRED EMBODIMENT

Figure 8:
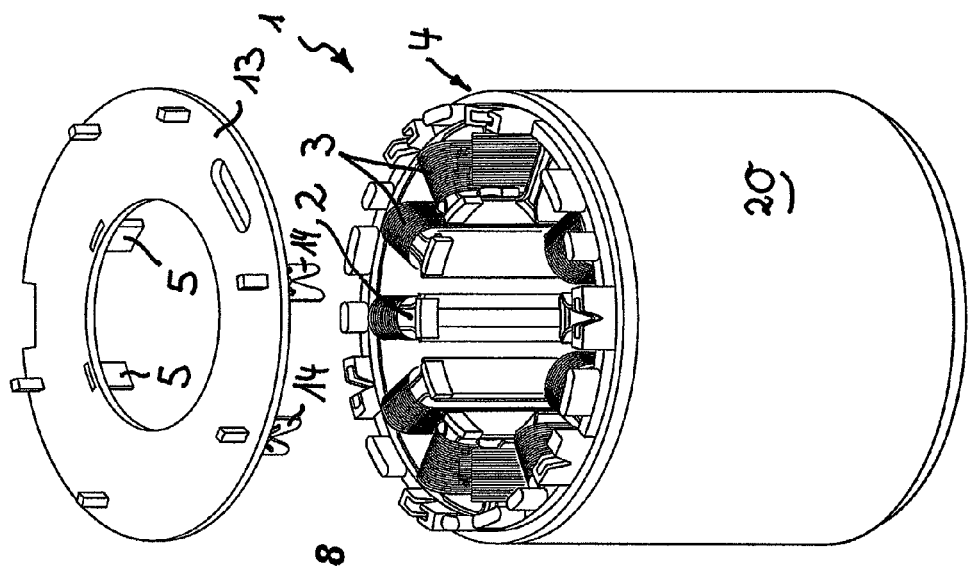
FIG. 8 is a view of the stator of a brushless direct current motor in an assembled state.

FIG. 8 shows the stator 1 of a brushless direct current motor in a perspective illustration, with said direct current motor being useable, for example, as a pump drive, particularly for a diaphragm pump. The direct current motor is here allocated to a rotor, not shown in greater detail, which carries permanent magnets at its outer perimeter. The rotor is driven by way of commutation, i.e. the change of the direction of flow of the alternating magnetic field of the circular stator 1, with the rotor rotating inside the circularly surrounding stator 1. The magnetic field can be created by a multi-phase coil system 2 with wire coils 3 spaced apart from each other in the circumferential direction, which are wound onto an insulating body, in its entirety marked 4.

Control electronics are provided to control the wire coils of the wire system, spaced apart from each other and provided in the stator, comprising non-contact rotary position sensors 5 allocated to the phases of the coil system 2. These rotary position sensors 5 may be embodied as Hall sensors, for example.

FIGS. 1 through 7 shows the individual production steps for producing the stator 1 shown in FIG. 8. The insulating body of the stator 1, in its entirety marked 4, comprises a solid, sheath-like stator housing 20, which carries coil protrusions 6 at its interior housing perimeter, which delimit the grooves 7 oriented in the longitudinal direction therebetween. The interior wall perimeter delimiting the grooves 7 is coated by a groove insulation 8, arranged in the grooves 7. Circular insulation caps 9 are put onto the faces of the stator housing 20, which show bag-shaped recesses 10 at the interior side of the perimeter in the area of the grooves 7 and the groove insulation 8. These recesses 10 of the insulation caps 9 are also separated by coil protrusions 11, spaced apart from each other at the perimeter of the interior wall. The rotary position sensors 12 are arranged on a sensor carrier 13 and project in the direction towards the stator 1.

The rotary position sensors 5 are arranged on a sensor carrier 13 and project in the direction towards the stator 1. The sensor carrier 13 is embodied as a sensor plate, preferably carrying all of the rotary position sensors 5. Positioning aids cooperating with each other are provided between the at least one sensor carrier 13 and the adjacent stator face, which determine the relative position of the stator 1 in reference to the sensor carrier 13 and the rotary position sensors 5 arranged thereupon.

Figure 1:
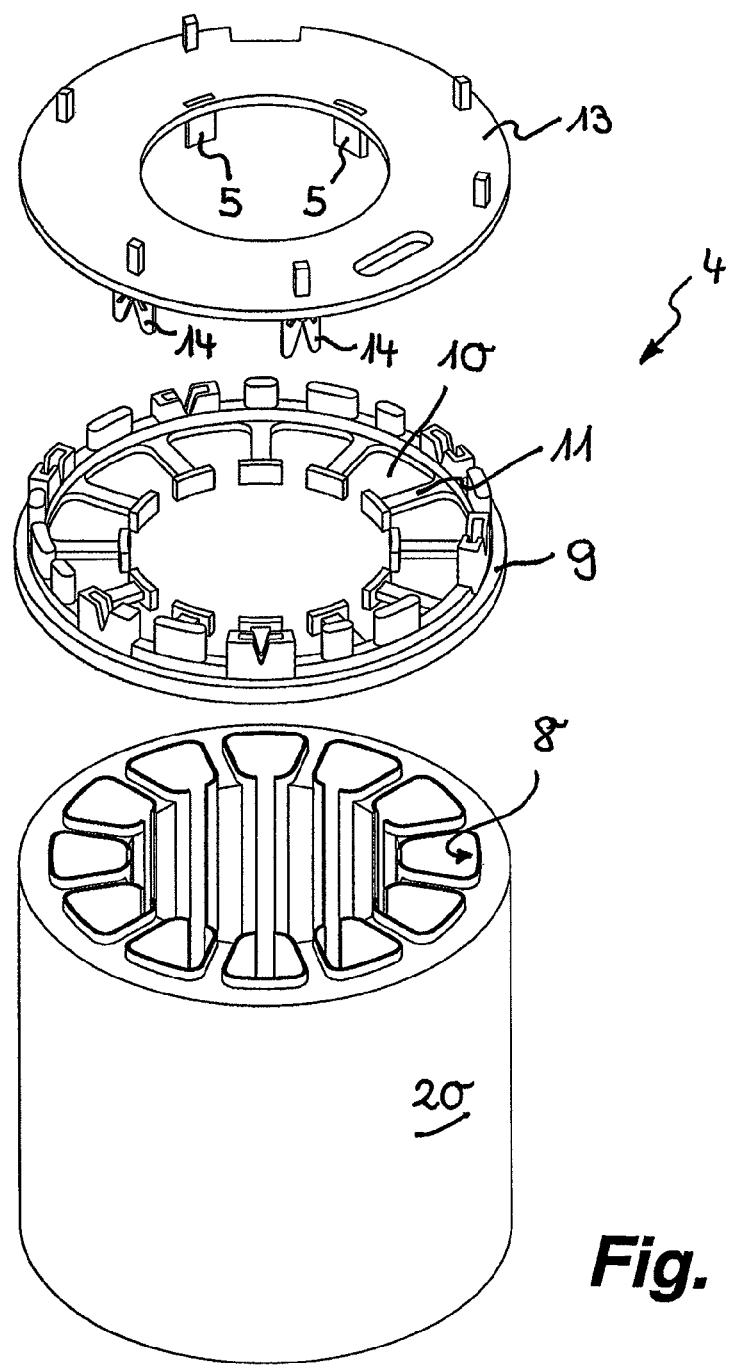
FIG. 1 shows the components of the stator of a brushless direct current motor in an exploded perspective illustration.
Figure 1:
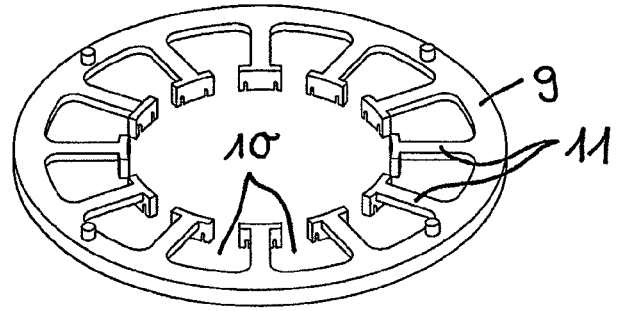
Figure 2:
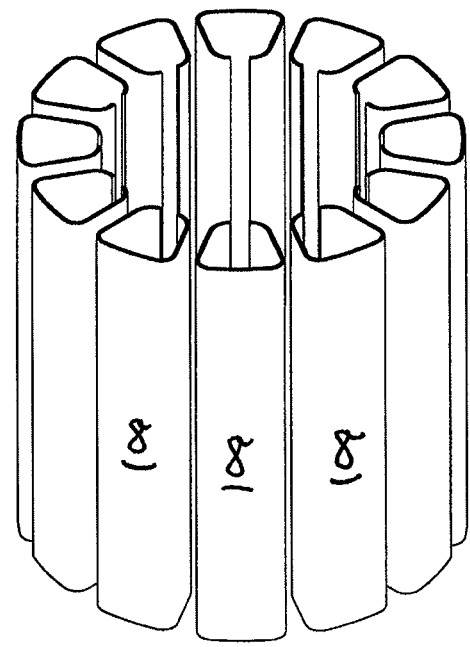
FIG. 2 is a view of the stator housing of the direct current motor shown in FIG. 1 serving as the stator package, with the stator housing comprising grooves at its interior perimeter of the housing, separated from each other by coil protrusions projecting radially inwardly, each separated from each other by a groove insulation inserted into the grooves.
Figure 2:
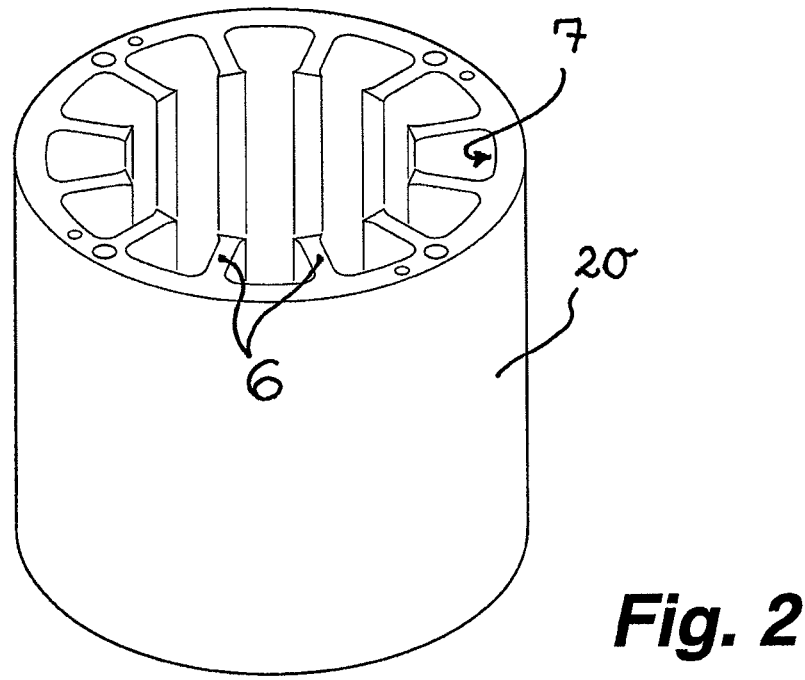
Figure 3:
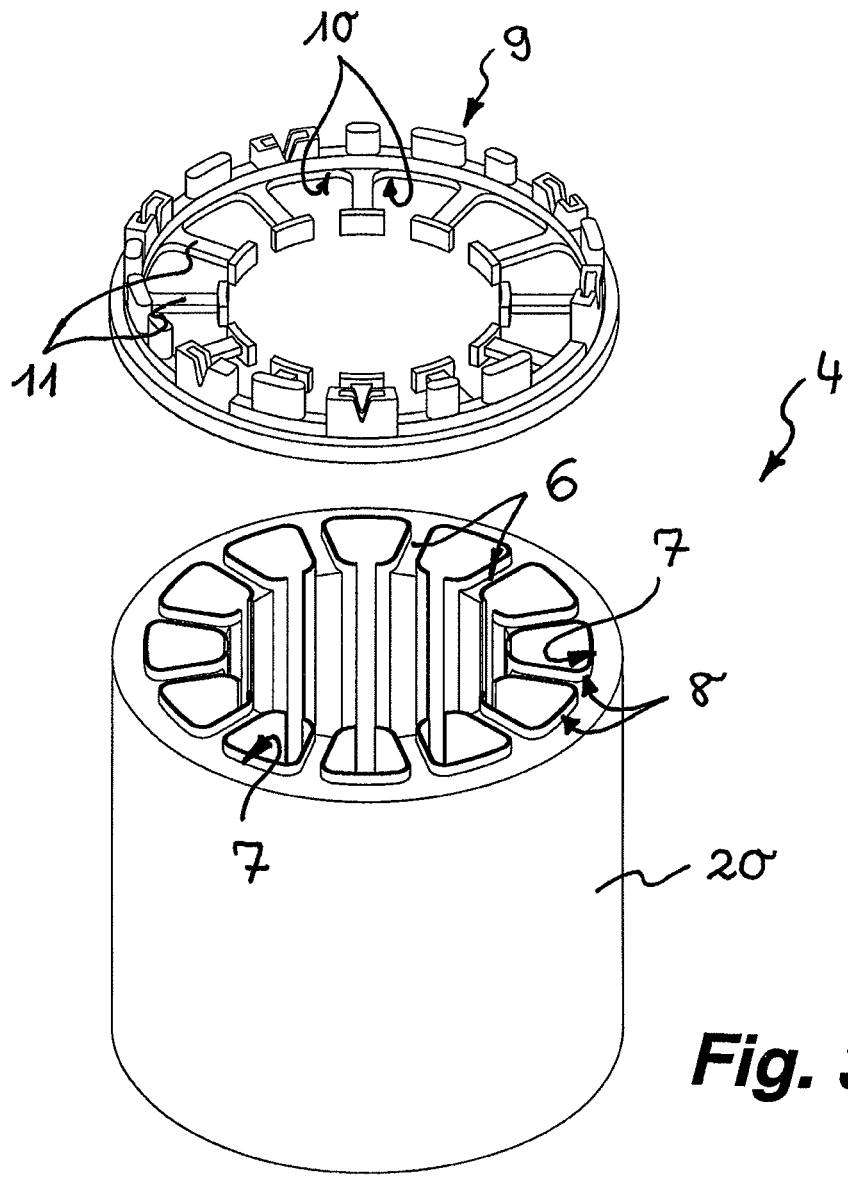
FIG. 3 is a view of the stator housing of the stator shown in FIGS. 1 and 2 carrying the groove insulations, with insulation caps being provided at the two faces of the stator housing and with one of the insulation caps can be connected to a sensor carrier.
Figure 4:
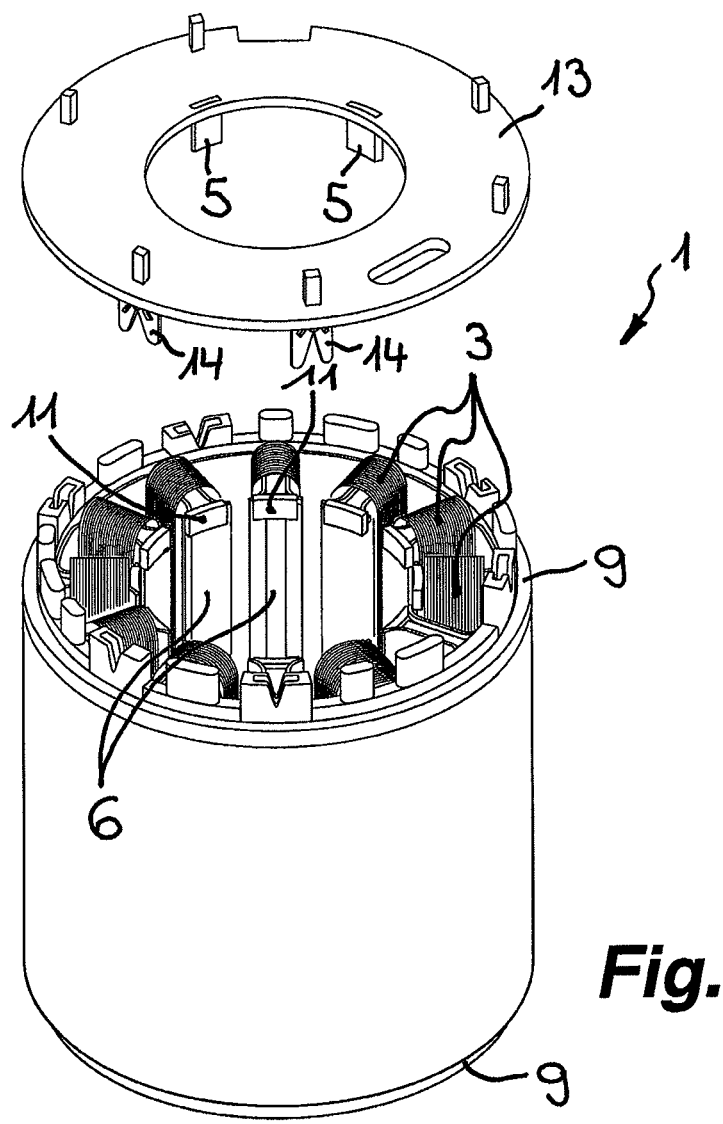
FIG. 4 is a view of the stator housing of the stator shown in FIGS. 1 through 3, already preassembled to a stator package, with a sensor carrier fastenable at one of the faces of the stator, at which rotary position sensors project in the direction towards the stator.

In the exploded illustration of the stator 1 for a brushless direct current motor in FIG. 4 it is easily discernible that the wire coils 3, spaced apart from each other, are wound inside the groove insulations 8 around the coil protrusions 6, 11 projecting on the one side at the insulation caps 9 and on the other side at the interior circumference of the stator housing 2.

Figure 5:
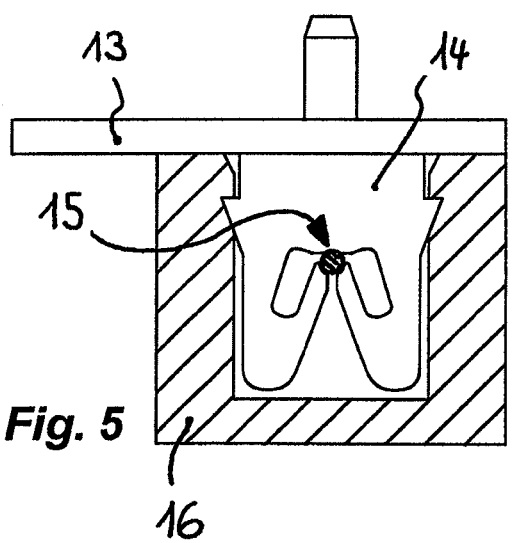
FIG. 5 is view of a partially longitudinal cross-sectioned area of the sensor carrier of FIG. 4 showing a cutting terminal serving as a positioning aid.
Figure 6:
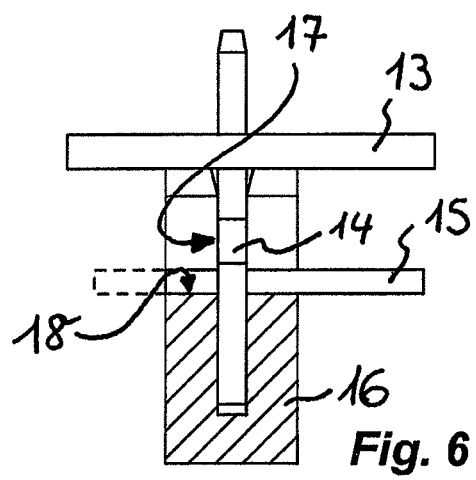
FIG. 6 is a view of the sensor carrier of FIGS. 4 and 5 in a partially cross-sectioned area of a cutting terminal.

It is illustrated in FIGS. 4 through 7 that the part of the control electronics located on the sensor carrier 13 and surrounding the rotary position sensors 5 is connected to the supply lines 15 of the wire coils 3, spaced apart from each other, via electric contacts embodied as positioning aids. Here, the electric contacts embodied as positioning aids are provided on the sensor carrier 13. In FIGS. 5 and 6 it is discernible that the contacts provided at the sensor carriers 13 and serving as positioning aids are here embodied as cutting terminals 14.

Figure 7:
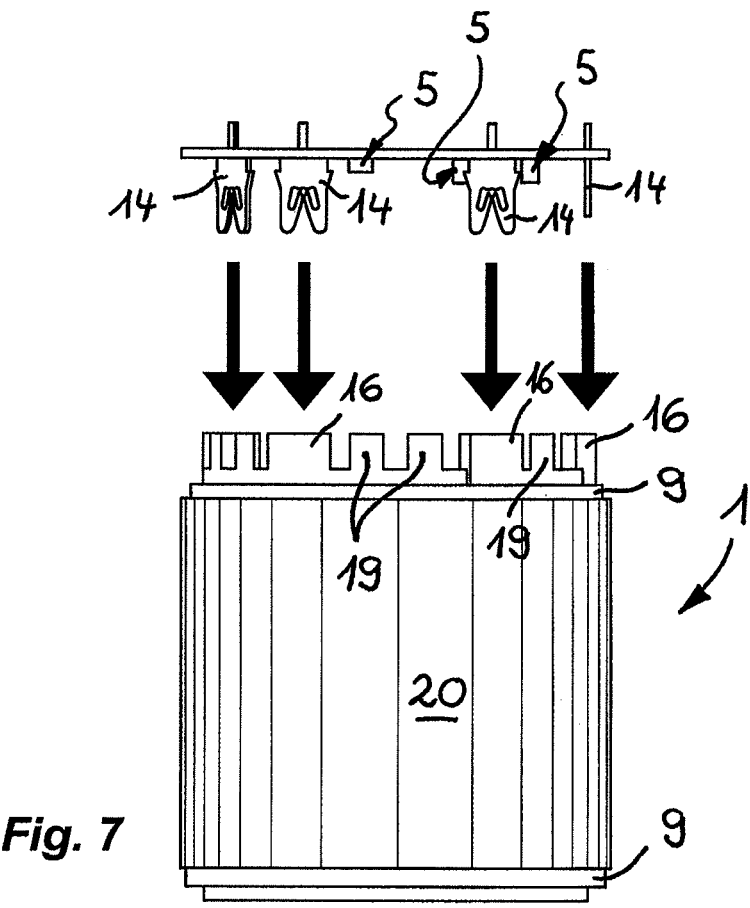
FIG. 7 is a view of the stator of FIGS. 1 through 4 immediately prior to the precisely positioned plug connection of the sensor carrier being made.

FIGS. 5 and 6 show that the supply lines 15 of the wire coils 3, spaced apart from each other, are held by the wire sections contacting the cutting terminals 14 in wire guides 16 of the stator 1 in a defined position. Here, each wire guide 16 comprises guide openings 17, 18 embodied in a slot-shaped fashion and intersecting each other, with one guide opening 17 serving to accept a wire section contacting the cutting terminal 14 and with another one representing another guide opening 18, open at the face, for inserting a cutting terminal 14. FIG. 7 shows that by a simple plug connection of the cutting terminals 14, projecting from the sensor carrier 13, onto the wire guides 16 of the stator 1 and by inserting said cutting terminals 14 into the guide slots 17 provided at the wire guides 16 they can be connected to the stator 1 in a simple fashion and electrically contacting.

Here, it is discernible from FIGS. 4 and 7 that the stator at least at one face comprises crown-shaped protrusions 16, 19 allocated to the sensor carrier 13, with at least individual protrusions being embodied as wire guides 16.

Figure 9:
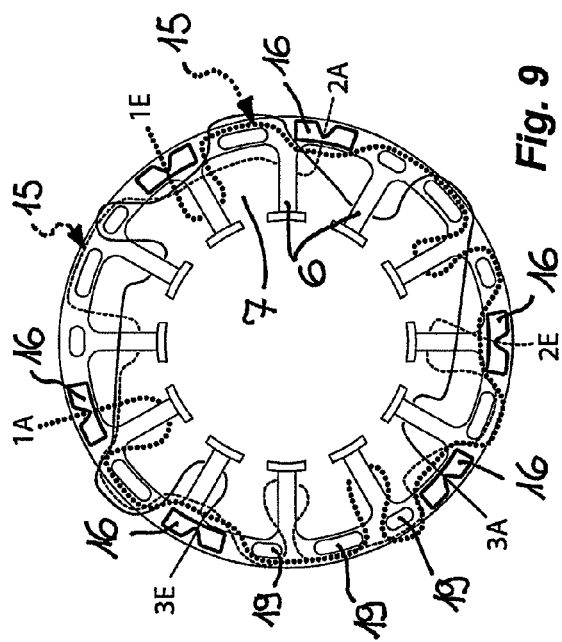
FIG. 9 is a view of the coil system of the stator shown in FIGS. 1 through 4 and 7 through 8 in a schematic illustration.
Figure 10:
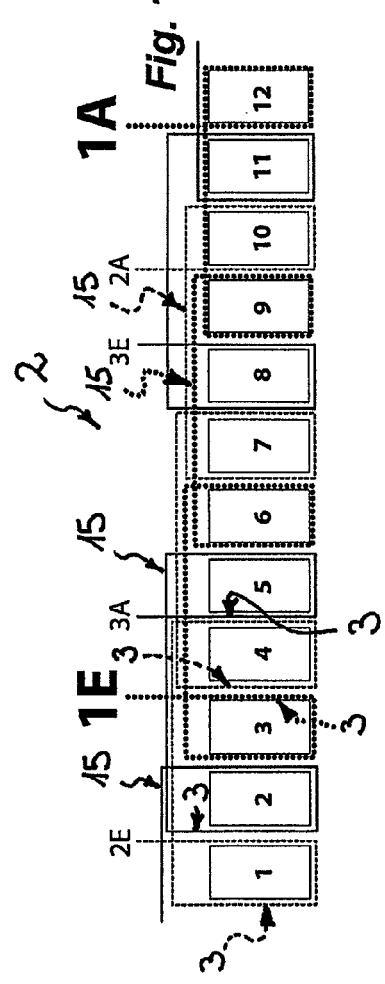
FIG. 10 is a schematic view of the coil system of the wire coils provided in the stator and spaced apart from each other.

By the meandered winding around these crown-shaped protrusions 16, 19, illustrated in FIG. 9, the wire coils 3, spaced apart from each other and allocated to the supply lines 15, can be securely and easily arranged at the housing perimeter of the stator 1.

The stator 1 shown here comprises a sheath-like stator housing 20 with insulating caps 9 being provided at its faces. Here, the insulating cap 9 allocated to the sensor carrier 13 is embodied for connecting to the sensor carrier 13, with the insulating caps 9 provided at both sides of the stator 1 carry the wire coils 3 of the stator 1, spaced apart from each other and allocated to the multi-phase coil system 2.

By the use of the insulating caps 9 provided at both sides of the stator faces, a fully automated winding process is ensured during the production of the stator 1. Using the cutting terminals 14 provided at the sensor carrier 13 and serving as positioning aids, an isolation of the wire ends allocated to the wire coils 3 can be omitted. Any soldering of the control electronic in the area of the rotary position sensors 5 is no longer necessary, either, because the electric contact can be achieved without soldering by a plug connection using the cutting terminals 14. Due to the fact that the rotary position sensors are protruding from the sensor carrier 13 in their correct position no additional fastening material is necessary to allow fastening the rotary position sensors 12 at their correct position in the area of the stator 1.

The stator 1 shown here and intended for a brushless direct current motor can therefore be produced cost-effectively in an automated production process in a simple fashion.

The invention claimed is:

1. A brushless direct current motor comprising:
    a) a rotor having permanent magnets, which rotates in a commutation created alternating magnetic field of a stator (1),
    b) with the magnetic field being created by a coil system of electric wire coils (3) arranged in a circumferential direction spaced apart from each other on an insulating body (4),
    c) with control electronics being provided for controlling the electric wire coils, spaced apart from each other, of the coil system provided in the stator (1),
    d) non-contact rotary position sensors (5) being allocated to phases of the coil system (2),
    e) the rotary position sensors (5) are arranged on a sensor carrier (13), the stator has end faces and the sensor carrier (13) is fastened on one of the end faces of the stator (1), and
    f) positioning aids, cooperating with each other, are provided between the sensor carrier (13) and an adjacent one of the stator faces, the positioning aids determine a relative position of the stator (1) in reference to the sensor carrier (13) and the rotary positioning sensors (5) arranged thereupon,
    g) the control electronics are connected to supply lines (15) of the wire coils (3) that are spaced apart from each other, via electric contacts embodied as the positioning aids,
    h) the electric contacts embodied as the positioning aids are provided on the sensor carrier (13) and comprise cutting terminals (14),
    i) the sensor carrier (13) upon which the rotary position sensors (5) allocated to phases of the coil system (2) are arranged is a single sensor carrier (13),
    j) the supply lines (15) of the wire coils (3), spaced apart from each other, are held with wire sections thereof contacting the cutting terminals (14) in wire guides (16) of the stator (1) that define part of the positioning aids,
    k) the stator (1) comprises a sheath-like stator housing (20), with an insulating cap (9) being provided at each of the faces, with at least one of the insulating caps (9) being connected to the sensor carrier (13),
    l) the insulating caps (9) provided at both sides of the stator (1) carry between each other the wire coils (3), spaced apart from each other, of the multi-phase coil system (2) of the stator (1), and
    m) the at least one of the insulating caps (9) that is connected to the sensor carrier (13) comprises protrusions (16, 19) that are crown-shaped, and meandering wires of the wire coils (3) extend at least partially around each of the protrusions (16, 19), with at least individual ones of the protrusions (16, 19) being embodied as the wire guides (16).

2. A direct current motor according to claim 1, wherein each of the wire guides (16) has guide openings (17, 18) intersecting each other, with one of the guide openings (17) receiving the wire sections contacting the cutting terminal (14) and with the other of the guide openings (18) open at a face thereof receiving one of the cutting terminals (14).

3. A direct current motor according to claim 2, wherein the guide openings (17, 18) provided to at least one of receive the wire sections or to receive the cutting terminals (14) are slot-shaped.

* * * * *